(12) United States Patent
Guermoud et al.

(10) Patent No.: US 11,348,210 B2
(45) Date of Patent: May 31, 2022

(54) INVERSE TONE MAPPING METHOD AND CORRESPONDING DEVICE

(71) Applicant: InterDigital VC Holdings, Inc., Wilmington, DE (US)

(72) Inventors: Hassane Guermoud, Cesson-Sevigne (FR); Laurent Cauvin, Cesson-Sevigne (FR); Jonathan Kervec, Cesson-Sevigne (FR); Tania Pouli, Le Rheu (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/955,850

(22) PCT Filed: Dec. 12, 2018

(86) PCT No.: PCT/US2018/065143
§ 371 (c)(1),
(2) Date: Jun. 19, 2020

(87) PCT Pub. No.: WO2019/125857
PCT Pub. Date: Jun. 27, 2019

(65) Prior Publication Data
US 2020/0320672 A1    Oct. 8, 2020

(30) Foreign Application Priority Data
Dec. 21, 2017   (EP) ..................................... 17306862

(51) Int. Cl.
*G06T 5/50* (2006.01)
*G06T 5/00* (2006.01)
(Continued)

(52) U.S. Cl.
CPC .............. *G06T 5/009* (2013.01); *G06F 17/11* (2013.01); *G06T 5/50* (2013.01); *G06V 10/757* (2022.01); *G06T 2207/20208* (2013.01)

(58) Field of Classification Search
CPC .......... G06F 17/11; G06K 9/6211; G06T 5/50
See application file for complete search history.

(56) References Cited

U.S. PATENT DOCUMENTS

| | | |
|---|---|---|
| 6,813,041 B1 | 11/2004 | Moroney et al. |
| 8,289,412 B2 | 10/2012 | Banterle et al. |
| 2012/0201456 A1 | 8/2012 | El-Mahdy et al. |

(Continued)

FOREIGN PATENT DOCUMENTS

| | | |
|---|---|---|
| EP | 3249605 A1 | 11/2017 |
| WO | WO 2015096955 A1 | 7/2015 |
| WO | WO 2017032822 A1 | 3/2017 |

OTHER PUBLICATIONS

Banterle et al., "A Framework for Inverse Tone Mapping", The Visual Computer, vol. 23, May 2007, pp. 467-478.
(Continued)

*Primary Examiner* — Myron Wyche
(74) *Attorney, Agent, or Firm* — Condo Roccia Koptiw LLP (57) ABSTRACT

The present disclosure involves expanding the dynamic range of low dynamic range images and concerns obtaining a first expansion exponent map for an image, and determining, for each pixel of the image, an expanded luminance value by performing an exponentiation with an expansion exponent value determined from the first expansion exponent map on a luminance value of the pixel, and can include calculating, for the pixel of the image, an expansion correcting value by using a modulating function that takes as input a value representative of the luminance of the pixel and is an increasing function whose increase is higher for higher (Continued)

input values, and subtracting the expansion correcting value from the expansion exponent value of the first expansion exponent map.

20 Claims, 5 Drawing Sheets

(51) Int. Cl.
*G06F 17/11* (2006.01)
*G06V 10/75* (2022.01)

(56) References Cited

U.S. PATENT DOCUMENTS

2015/0213766 A1   7/2015  Sugimoto
2016/0238830 A1*  8/2016  Mickolajczyk .... G01N 21/6458
2017/0048520 A1*  2/2017  Seifi ..................... H04N 19/172

OTHER PUBLICATIONS

Rempel et al., "Ldr2Hdr: On-the-fly Reverse Tone Mapping of Legacy Video and Photographs", ACM Transactions on Graphics, vol. 26, Issue 3, Jul. 2007, 6 pages.

Huo et al., "A LDR Image Expansion Method for Displaying on HDR Screen", 2013 International Conference on Computational Problem-Solving (ICCP), Jiuzhai, China, Oct. 26, 2013, pp. 234-237.

Kovalesk et al., "High-Quality Brightness Enhancement Functions for Real-Time Reverse Tone Mapping", The Visual Computer, vol. 25, May 2009, pp. 539-547.

\* cited by examiner

INVERSE TONE MAPPING METHOD AND CORRESPONDING DEVICE

This application is the national stage entry under 35 U.S.C. § 371 of International Application PCT/US2018/065143, filed Dec. 12, 2018, which was published in accordance with PCT Article 21(2) on Jun. 27, 2019, in English, and which claims the benefit of European Patent Application No. EP17306862.8, filed Dec. 21, 2017.

1. TECHNICAL FIELD

The present invention relates generally to the field of high dynamic range imaging and addresses the way of expanding the dynamic range of low or standard dynamic range images.

2. BACKGROUND ART

Recent advancements in display technology are beginning to allow for an extended dynamic range of color, luminance and contrast in images to be displayed. The term "images" refer to an image content that can be for example a video or a still picture.

Technologies allowing for an extended dynamic range in luminance or brightness of images are known as high dynamic range imaging, or HDR imaging. A number of display devices having the capability of processing and displaying HDR images with an extended dynamic range are already available for customers. Image capturing devices capable of capturing images with such an increased dynamic range are also being developed. However, HDR images are not yet well widespread and there exists many existing images that are SDR (for Standard dynamic range) or LDR (for Low Dynamic Range) images. Therefore, there is a need to visualize low or standard dynamic range (LDR or SDR) images on the recent high dynamic range (HDR) devices.

For this purpose, reverse or inverse tone mapping operators (iTMO) have been developed. They allow to generate HDR images from conventional (LDR or SDR) images, by using algorithms that process the luminance information of pixels in the images with the aim of recovering or recreating the appearance of the original scene.

Different kinds of inverse tone mapping algorithms exist, as for instance local tone mapping algorithms and global tone mapping algorithms. For example, in the field of local tone mapping algorithms, the patent application WO2015/096955 discloses a method comprising, for each pixel p of the image, the steps of obtaining a pixel expansion exponent value $E(p)$ and then inverse tone mapping the luminance $Y(p)$ of the pixel p into an expanded luminance value $Y_{exp}(p)$ by computing the equation:

$$Y_{exp}(p)=Y(p)^{E(p)}*[Y_{enhance}(p)]^c \quad (1)$$

wherein $Y_{exp}(p)$ is the expanded luminance value of the pixel p;

$Y(p)$ is the luminance value of the pixel p within the SDR (or LDR) input image;

$Y_{enhance}(P)$ is the luminance enhancement value for the pixel p within the SDR (or LDR) input image obtained by high-pass filtering;

$E(p)$ is the pixel expansion exponent value for the pixel p.

The set of values $E(p)$ for all pixels of an image form an expansion exponent map, or "expansion map", for the image. This expansion exponent map can be generated by different methods, for example by low-pass filtering the luminance value $Y(p)$ of each pixel p to obtain a low-pass filtered luminance value $Y_{base}(p)$ and applying a quadratic function to the low-pass filtered, said quadratic function being defined by parameters a, b and c according to the equation:

$$E(p)=a[Y_{base}(p)]^2+b[Y_{base}(p)]+c$$

The dedicated tools, called the inverse tone mapping operators (iTMO), developed to implement inverse tone mapping methods to SDR images can be used:

either within a post-production tool to help colorists for manual grading, or as hardware implementation within a SoC (System On Chip) integrated for example in a set-top box or TV set, to execute an automatic grading.

In the first case, the images are manually processed by colorists, which gives good results since the artistic intent of the film maker can be preserved. However, such a method cannot be performed on the fly, for example in real time when receiving a video in a streaming mode.

In the second case, predetermined expansion parameters (parameters a, b and c in the above example) are applied to the SDR (or LDR) images without any adaptation to the original video or image content and without any manual intervention of the colorists. Such an inverse tone mapping can be performed on the fly and therefore can be used in devices such as a set-top-box or a TV set. But the results are not as good as those issued from a manual grading of colorists, since the operation of inverse tone mapping cannot well adapt to the image.

To solve the above problem, EP3249605 discloses a method for inverse tone mapping of an image that can adapt automatically to the content to tone-map. The method uses a set of profiles forming a template. These profiles are determined in a learning phase that is an offline processing. Each profile is defined by a visual feature, such as a luminance histogram, to which an expansion map is associated. In the learning phase, the profiles are determined from a large number of reference images that are manually graded by colorists, who manually set the ITM parameters and generate the expansion maps for these images. Then the reference images are clustered based on these generated expansion maps. Each cluster is processed in order to extract a representative histogram of luminance and a representative expansion map associated thereto, thus forming a profile issued from said cluster. The template including the plurality of profiles is then stored in a hardware memory, for example in a set-top-box or a TV device.

In a subsequent operating phase, a new SDR image content is received for example by a set-top-box in a streaming mode. At input, a processing unit (for example a CPU, a SoC or a FPGA) analyses the SDR video stream at real time. A real-time histogram processing module determines histograms for SDR images of the content. For example, after each cut detection in the content, the processing unit computes histogram on the first frame after the detected cut. Alternatively, the histogram can be computed on the $n^{th}$ frame after the detected cut, before the next cut. The computed histogram of the received SDR image content is compared to each of the histograms saved in the template, issued from the learning phase, in order to find the best match histogram of the template. For example, a distance between the computed histogram of the received content and each of the histograms saved in the template is calculated. Then the expansion map related to the histogram of the template giving the best match is selected and used to perform inverse tone mapping on the fly to all the images of the same shot (that is all the images between the detected cut and the following cut) and output corresponding HDR images. In this way, the best extension map of the template is applied to output the HDR video.

With such an inverse tone mapping method, the quality of the grading is dependent on the number of different profiles inside the template or model: the more profile there are, the better the grading is. Therefore, a way to improve the quality of grading is to generate more profiles in the learning phase. However, since the memory resources in the processing device (set-top-box or TV device) are limited, such an approach is not actually a solution.

Thus, the known ITM conversion from SDR to HDR, or inverse tone mapping, method can result in a bad grading for some luminance ranges. In particular, highlights or bright parts on wide areas in the SDR images can result in areas that are too bright in the HDR images. The present invention aims to improve the situation.

3. SUMMARY OF INVENTION

It is an object of the invention to propose a method for inverse tone mapping that can be applied to images, for example in video sequences on the fly, which uses a predetermined expansion map and can be better adapted to the image, avoiding in particular some areas that are too bright in the output image.

A subject of the invention is a method for inverse tone mapping of at least a part of an image comprising:
  obtaining a first expansion exponent map for said image;
  determining, for at least a pixel of the image, an expanded luminance value by performing an exponentiation with an expansion exponent value determined from said first expansion exponent map on a luminance value of said pixel,
  the method further comprises:
  calculating, for said pixel of the image, an expansion correcting value by using a modulating function that takes as input a value representative of the luminance of said pixel and is an increasing function whose increase is higher for higher input values;
  obtaining a corrected expansion exponent value for said pixel by subtracting said expansion correcting value from the expansion exponent value of the first expansion exponent map, and
  determining (S4), for said pixel (p) of the image (I), an expanded luminance value (Yexp(p)) by performing an exponentiation with said corrected expansion exponent value on the luminance value (Y(p)) of said pixel (p).

The correction applied to the expansion exponent value taken from the first predetermined expansion map allows to reduce locally the effect of this first predetermined expansion map in bright areas of the image.

Advantageously, said modulating function achieves an exponentiation with a fixed exponent parameter on the input value. Said input value is for example a normalized value of the low-pass filtered luminance value of said image pixel. The fixed exponent parameter can be equal or higher than 3, preferably equal to 6.

Advantageously, the expansion correcting value is determined by applying a weighting factor to a reference expansion correcting value resulting from the exponentiation with the fixed exponent parameter, and the weighting factor depends on the image and on the first predetermined expansion exponent map.

In a particular embodiment of the invention, said weighting factor is calculated from
  a first luminance threshold value that is a luminance value ensuring that a predetermined percentage of the pixels of the image have luminance values higher than said first threshold luminance value;
  a second luminance threshold value corresponding to a luminance value of a pixel of the image that is tone mapped into a target maximal value of expanded luminance using the first expansion map.

Advantageously, said weighting factor is calculated using:
  a first expansion exponent value assigned to said first luminance threshold value of said image through said first predetermined expansion exponent map;
  a second expansion exponent value assigned to said second luminance threshold value through said expansion exponent map;
  a reference attenuating value resulting from the exponentiation with said fixed exponent parameter on a normalized value of said first luminance threshold value.

Thus, the weighting factor $p_{bright}$ can be calculated using the expression:

$$p_{brigth} = \frac{E(p_1) - E(p_2)}{M_{brigth(p_1)}}$$

where
  $E(p_1)$ represents the first expansion exponent value;
  $E(p_2)$ represents the second expansion exponent value;
  $M_{brigth}(p_1)$ represents a reference attenuating value that is the result of the exponentiation with said fixed exponent parameter on a normalized value of the first luminance threshold value.

According to another aspect of the invention, the modulating function assigns to an image pixel p having a low-pass filtered luminance value $Y_{base}(p)$ a reference attenuating value $M_{bright}(p)$ by calculating the expression $$M_{bright}(p) = \left(\frac{Y_{base}(p)}{255}\right)^{\gamma}$$

where γ is said fixed exponent parameter.

Advantageously, said second expansion exponent value is calculated by dividing the logarithm of said target maximal value of expanded luminance by the logarithm of said second luminance threshold value.

Preferably, the method of the invention comprises comparing said first luminance threshold value and said second luminance threshold value, and the correcting is executed only if the condition that said first luminance threshold value is superior to said second luminance threshold value is satisfied.

In a particular embodiment, the first predetermined expansion exponent map is generated from low-pass filtered luminance value $Y_{base}(p)$ of the image pixels p using a quadratic function defined by the relation:

$$E(p) = a[Y_{base}(p)]^2 + b[Y_{base}(p)] + c.$$

where a, b, and c are parameters of the quadratic function.

Advantageously, obtaining an expansion exponent map for said image comprises
  obtaining a visual feature for said image representative of luminance of said image,
  comparing the visual feature of said image with visual features of at least two clusters of reference images according to a distance criterion, wherein the visual feature of a cluster is representative of the luminance of reference images of this cluster, selecting for said image the expansion exponent map related to the visual feature of a cluster which is the closest to the visual feature of said image.

The visual feature of said image comprises for example a histogram on luminance of the pixels of said image.

The invention concerns also:
An image processing device comprising means for implementing the method previously defined in order to inverse tone map an image;
An electronic device comprising an image processing device.

4. BRIEF DESCRIPTION OF THE DRAWINGS

The invention can be better understood with reference to the following description and drawings, given by way of example and not limiting the scope of protection, and in which.

5. DESCRIPTION OF EMBODIMENTS

The functions of the various elements shown in the figures may be provided through the use of dedicated hardware as well as hardware capable of executing software in association with appropriate software.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The invention may be notably implemented as a combination of hardware and software. Moreover, the software may be implemented as an application program tangibly embodied on a program storage unit. Such a software can take the form of a plug-in to be integrated to another software.

The application program may be uploaded to, and executed by, an image processing device comprising any suitable architecture. Preferably, the image processing device is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit, a display device, a printing unit, . . . . The image processing device implementing the embodiment of the method according to the invention may be part of any electronic device able to receive images, for instance a TV set, a set-top-box, a gateway, a cell phone, a tablet. The electronic device further comprises a HDR display capable of displaying HDR images with an expanded luminance. In the present embodiment, the luminance range of the HDR device comprises integer luminance values between 0 and 1000, whereas the luminance range of the SDR image I comprises integer luminance values between 0 and 255.

The present invention concerns a method for inverse tone mapping of an image I that is a SDR (or LDR) image. The image I is for example an image extracted from a video content received by an electronic device including an image processing device. The inverse tone mapping applied to the SDR image I converts said SDR image I into an HDR image I' that can be displayed by the HDR display in the expanded luminance range.

Figure 1:
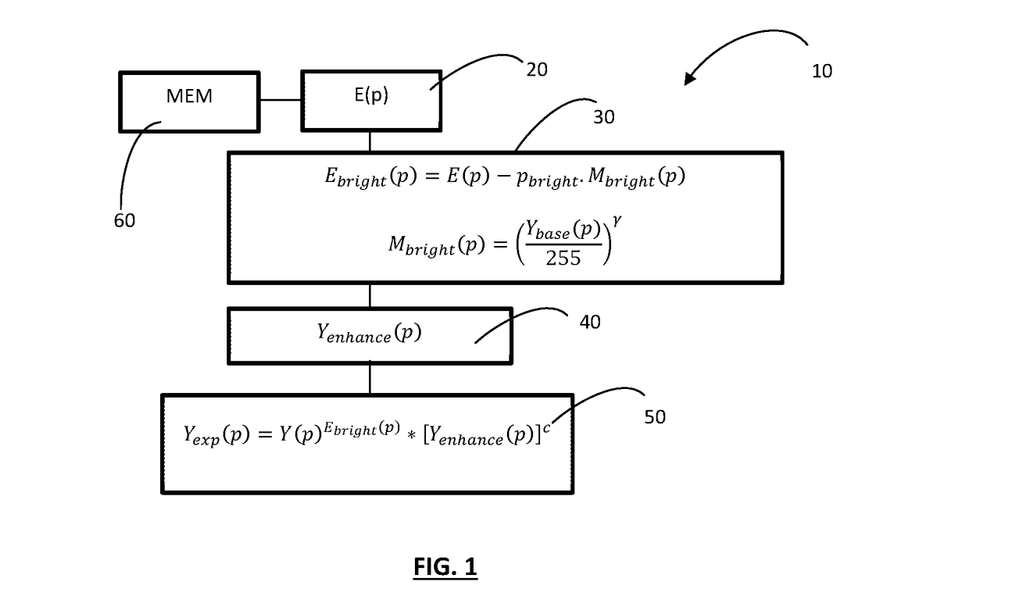
FIG. 1 is a block diagram of an image processing device configured to carry out the method according to an embodiment of the invention.

The image processing device 10, as represented on FIG. 1, comprises:
an expansion map determination module 20 configured to obtain a predetermined expansion exponent map E(p) to apply to the image I;
a modulating module 30 configured for modulating the luminance expansion in some ranges of luminance;
a high frequency extraction module 40 configured for obtaining a pixel luminance-enhancement value for each/any pixel of the image, by extraction of high frequencies of luminance values of colors of pixels in the luminance neighborhood of this pixel;
an inverse tone mapping module 50 configured for inverse tone mapping the luminance of each/any pixel p of the image I into an expanded luminance, the expansion using the predetermined expansion exponent map E(p) that is corrected or attenuated by the modulating module 30, as described in more detail later in the description;
a memory 60 for storing a model or template that includes a plurality of N profiles $P_i$ with $2 \leq N$ and $1 \leq i \leq N$.

Figure 2:
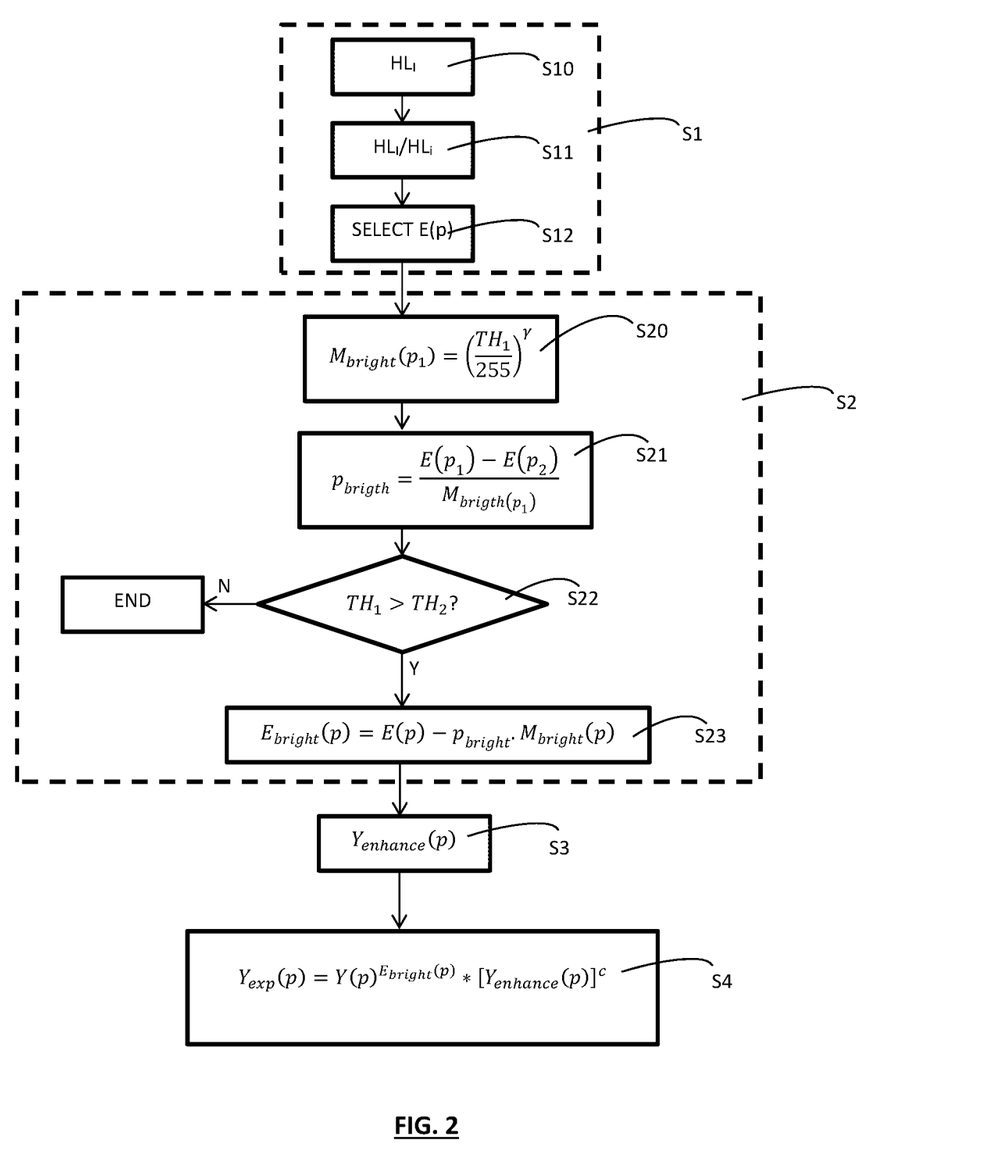
FIG. 2 represents an organigram of the method steps according to an embodiment of the invention.

A first embodiment of the method for inverse tone mapping of the image I will now be described in reference to FIG. 2, using the processing device as described above.

The method comprises a first step S1 of obtaining a predetermined expansion exponent map E(p) to apply to the image I. This first step uses a model or template that includes a plurality of N profiles $P_i$ with $2 \leq N$ and $1 \leq i \leq N$.

The N profiles $P_i$ are obtained in a learning phase from a plurality of reference images which are arranged into clusters, based on their respective luminance histograms, as described in EP3249605. The N profiles $P_i$ are issued from N clusters of reference images. A representative histogram on luminance $HL_i$ and an expansion exponent map $E_i(p)$ is assigned to each of the N clusters of reference images. Thus the two following associated elements are assigned to each profile $P_i$ issued from a cluster of reference images:
a visual feature, such as a histogram on luminance $HL_i$, which is representative of the luminance of reference images of this cluster and
an expansion exponent map $E_i(p)$.

The set of values $E_i(p)$ for all pixels of an image form an expansion exponent map, or "expansion map", for the image. This expansion map can be generated by different methods, for example by low-pass filtering the luminance value Y(p) of each pixel p to obtain a low-pass filtered luminance value $Y_{base}(p)$ and applying a quadratic function to the low-pass filtered, defined by parameters a, b and c according to the equation:

$$E_i(p) = a_i[Y_{base}(p)]^2 + b_i[Y_{base}(p)] + c_i \quad (1)$$

Thus, each model profile $P_i$ is defined by a representative histogram on luminance $HL_i$ and a set of parameters $a_i$, $b_i$, $c_i$ defining the quadratic function for computing the expansion exponent values and the expansion map $E_i(p)$.

The data of the N profiles $P_i$ are stored in a memory 60 of the image processing device 10.

Using the expansion map determination module 20 in the first step S1, a histogram on luminance $HL_I$ is computed for the image I to process in a sub step S10.

In a sub step S11, the histogram $HL_I$ of the image I is then compared to each of the histograms $HL_i$ saved in the template in memory 60, issued from the learning phase, according to a distance criterion, in order to find the best match model histogram. In other words, the visual feature $HL_I$ of the image I is compared with visual features $HL_i$ of the N clusters of reference images according to a distance criterion, wherein the visual feature of a cluster is representative of the luminance of reference images of this cluster.

Finally, in a sub step S12, the expansion map $E_i(p)$ (1≤i≤N) related to the model histogram giving the best match is selected. Thus, the best extension map of the template is selected to process the input SDR image I.

The predetermined expansion map issued from step S1 is noted E(p) in the following description.

For more details on the generation of the N profiles forming the model or template and the selection of an expansion map for the image I to process, the reader is invited to refer to EP3249605.

Using the modulating module 30, in a second step S2, an operation of bright spot modulation is carried out in order to reduce locally the effect of brightness expansion caused by the predetermined expansion map E(p) obtained in step S1 only in some bright areas of the image I while maintaining a smooth transition with the surroundings. The bright spot modulation will now be described for the input SDR image I.

The operation of bright spot modulation uses a modulating function (also called attenuating function or correcting function). This modulating function calculates a product of a reference modulating (or "correcting" or "attenuating") map $M_{bright}(p)$ with a weighting factor $p_{bright}$ and subtract this product from the predetermined expansion map E(p) obtained in step S1. Thus, a corrected (new) expansion exponent map $E_{bright}(p)$ is computed according to the equation:

$$E_{bright}(p) = E(p) - p_{bright} \cdot M_{bright}(p) \quad (2)$$

where
$E_{brigth}(p)$ represents the corrected expansion map;
E(p) is the predetermined expansion map obtained in step S1;
$M_{brigth}(p)$ is the modulating function, which generate a reference modulating or correcting map formed by the values given by the function for all the image pixels;
$p_{bright}$ is the weighting factor for controlling the strength of the correction.

The following sub steps that will now be described are executed to achieve the bright spot modulation and generate the corrected expansion exponent values forming the map $E_{bright}(p)$.

In a sub step S20, the reference expansion attenuating or correcting map $M_{bright}(p)$ is computed by using a reference modulating function $M_{bright}(p)$ that takes as input a value representative of the luminance of each pixel p of the image I. It is an increasing function that becomes more and more increasing for higher input values. In other words, the increasing function achieves an higher increase for higher input values. The increase is higher for higher input values. The higher the input values are, the more important the increase is. In the present embodiment, the input value is a low-pass filtered luminance value $Y_{base}(p)$ of the pixel p that is normalized. The reference attenuating function achieves an exponentiation with a fixed exponent parameter γ on this input value. In other words, it calculates the normalized low-pass filtered luminance value $Y_{base}(p)$ at the power of the fixed parameter γ according to the equation:

$$M_{bright}(p) = \left(\frac{Y_{base}(p)}{255}\right)^\gamma \quad (3)$$

where
255 is the maximal luminance value in the SDR image I;
γ is a fixed exponent value, that is for example equal or higher than 3, for example equal to 6;
$Y_{base}(p)$ is the low-pass filtered luminance value of the pixel p of the image I and
$M_{bright}(p)$ is a reference correcting or attenuating value for the pixel p of image I.

The function $M_{bright}(p)$ is adapted to operate mainly on the higher luminance values.

The weighting factor $p_{bright}$ is used to weight the correction to apply to the predetermined expansion value E(p) and thus control the strength of this correction. Its value depends on the image I to process and on the predetermined expansion map E(p) (obtained in step S1). It is a parameter for controlling the strength of the correction to apply to the expansion map E(p). It allows to quantify the amount of correction that has to be applied to the predetermined expansion map E(p), depending on the image I and said expansion map E(p).

In a sub step S21, the weighting factor $p_{bright}$ is calculated so as to reduce the expanded luminance in the large areas of highlight. The weighting factor $p_{bright}$ is intended to be applied (here multiplied) to a reference expansion correcting value $M_{bright}(P)$, that is the result of the exponentiation with the fixed exponent parameter γ of $$\frac{Y_{base}(p)}{255}.$$

This weighting factor $p_{bright}$ depends on the content of the image I and on the predetermined expansion exponent map E(p) obtained in step S1. It is calculated from
a first luminance threshold value $TH_1$ that is a luminance value ensuring that a predetermined percentage of the pixels of the image I have luminance values higher than said first threshold luminance value $TH_1$;
a second luminance threshold value $TH_2$ corresponding to a luminance value of a pixel p of the image I that is tone mapped into a target maximal value of expanded luminance using the predetermined expansion map E(p).

More precisely, the weighting factor $p_{brigh}$ is calculated using a first expansion exponent value $E(p_1)$ assigned to said first luminance threshold value $TH_1$ of said image I through said predetermined expansion exponent map E(p);

a second expansion exponent value $E(p_2)$ assigned to said second luminance threshold value $TH_2$ through said expansion exponent map E(p);

a reference correcting value $M_{brigth(p_1)}$ resulting from the exponentiation with said fixed exponent parameter γ on a normalized value of said first luminance threshold value $TH_1$.

The predetermined percentage of the pixels p of the image I used for determining the luminance threshold value $TH_1$ is for example 0.5% of the total number of pixels in the image I.

Figure 5:
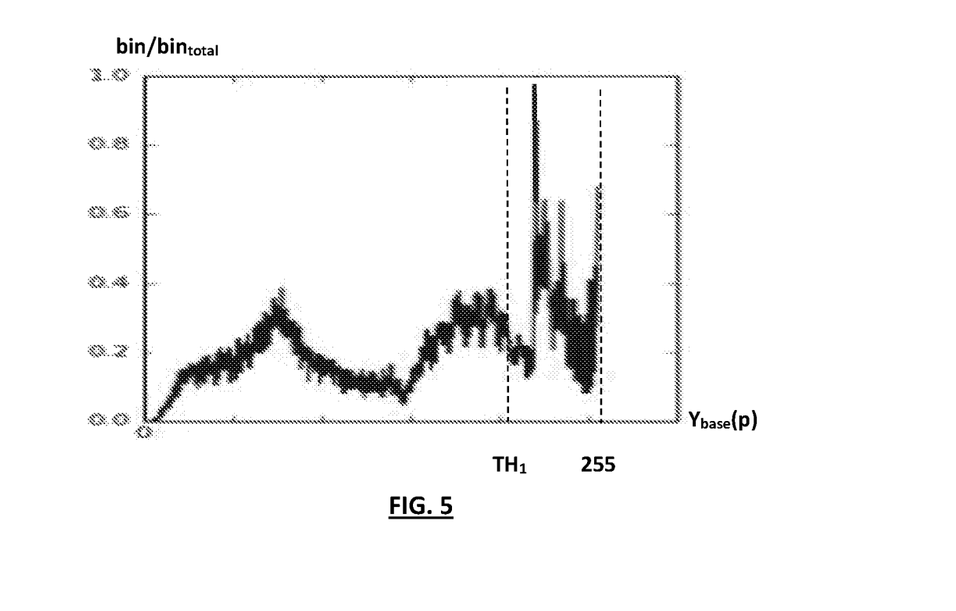
FIG. 5 represents a luminance histogram wherein the number of pixels is normalized and showing a first luminance threshold "$TH_1$"

The computation of the first expansion exponent value $E(p_1)$ achieved by the modulating module 30 will now be described. The element "$p_1$" represents a pixel of the image I having the threshold luminance value $TH_1$ that ensures that a predetermined percentage of the total number of image pixels have luminance values above $TH_1$. The threshold luminance value $TH_1$ is preferably a low-pass filtered luminance value. A preferable value for this percentage is 0.5%. However, a different percentage of the image pixels p could be used for determining the luminance threshold value $TH_1$. FIG. 5 represents a normalized histogram on luminance of the SDR image I, showing the threshold luminance value $TH_1$. In the SDR image I, the range of luminance values is comprised between 0 and 255. Thus, the luminance threshold $TH_1$ is determined according to the relation:

$$\Sigma_{k=TH_1}^{255} bin(k) = 0.5\% * N_p \quad (4)$$

where bin(k) represents the number of pixels of the image I having the luminance value k (preferably a low-pass filtered luminance value);

$N_p$ represents the total number of pixels in the image I.

The first expansion exponent value $E(p_1)$ is calculated according to the equation:

$$E(p_1) = a[TH_1]^2 + b[TH_1] + c \quad (5)$$

In addition, the modulating module 30 calculates a reference attenuating or correcting value $M_{bright}(p_1)$ for the pixel $p_1$, which means for the luminance value $TH_1$, according to the equation:

$$M_{bright}(p_1) = \left(\frac{TH_1}{255}\right)^\gamma \text{ where } \gamma = 6 \quad (6)$$

In other words, $M_{brigth(p_1)}$ represents the result of the exponentiation with the fixed exponent parameter γ on a normalized value of the first luminance threshold value $TH_1$.

Figure 6:
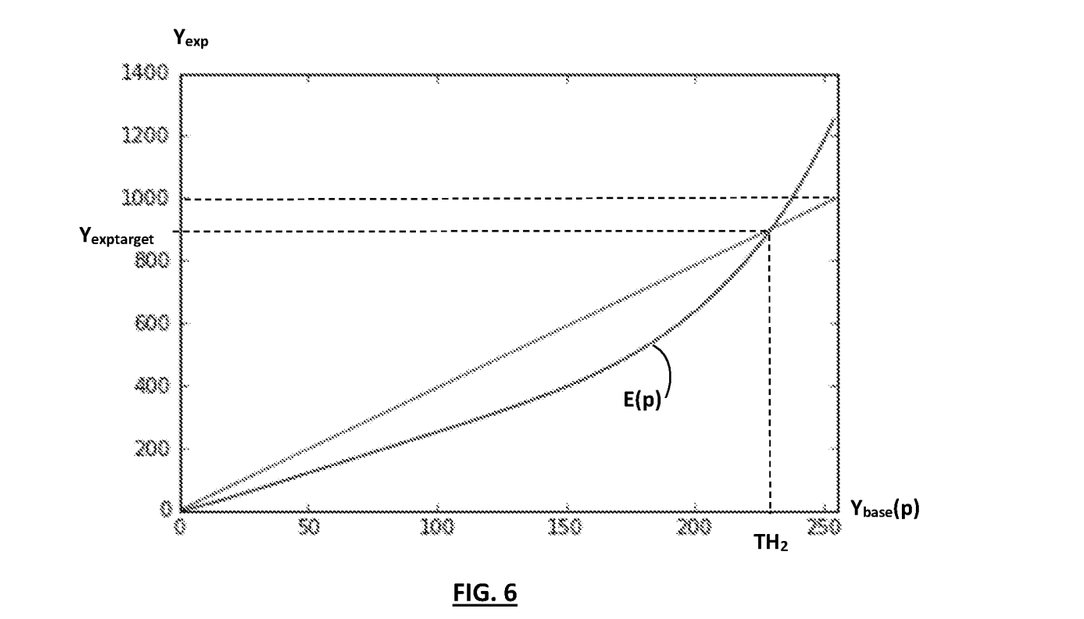
FIG. 6 is the same graph as the one represented in FIG. 3A and shows a second luminance threshold "$TH_2$".

The computation of the second expansion exponent value $E(p_2)$ achieved by the modulating module 30 will now be described. The element "$p_2$" represents a pixel of the image I having the threshold luminance value $TH_2$. This threshold $TH_2$ is the value of the input luminance of a pixel $p_2$ in the image I that match an output luminance $Y_{expTarget}$ to be set that is a target maximal value of expanded luminance through the predetermined expansion map E(p). This target maximal value of expanded luminance $Y_{expTarget}$ depends on the maximal luminance fixed by the HDR display (here 1000). In the present embodiment, the target expanded luminance $Y_{expTarget}$ is slightly less than maximal luminance of the HDR display, for example equal to 900. FIG. 6 represents the point on the predetermined expansion map E(p), that is defined by the threshold luminance value $TH_2$ and the target expanded luminance $Y_{expTarget}$ matching $TH_2$ as an output of the expansion. The second expansion exponent value $E(p_2)$ is calculated by dividing the logarithm of said target maximal value of expanded luminance by the logarithm of said second luminance threshold value $TH_2$, according to the equation:

$$E(p_2) = \frac{\log(Y_{expTarget})}{\log(TH_2)} \quad (7)$$

This expansion exponent value $E(p_2)$ corresponds to the expansion exponent value that is targeted after correction or attenuation of the expansion exponent values of the image pixels having high luminance values, such as the pixel $p_1$ having the luminance value $TH_1$. It can be noted $E_{bright}(p_1)$, when $TH_1 > TH_2$ as explained below.

After determination of the two threshold luminance values $TH_1$ and $TH_2$, a test sub step is performed in order to determine whether the bright spot modulation should be activated or not. The test consists in comparing the two threshold luminance values $TH_1$ and $TH_2$ and determining whether the condition that $TH_1$ is superior to $TH_2$ is satisfied or not. If the condition $TH_1 > TH_2$ is satisfied, the bright spot modulation is achieved. If not, the bright spot modulation is not executed.

Then, in the $p_{bright}$ calculating sub step S21, the value of $p_{bright}$ is calculated using the values $E(p_1)$, $E(p_2)$ and $M_{brigth(p_1)}$, according to the equation:

$$p_{brigth} = \frac{E(p_1) - E(p_2)}{M_{brigth(p_1)}} \quad (8)$$

After computation of the reference modulating map or function $M_{brigth(p)}$ and the weighting factor $p_{brigth}$ for the image I and the predetermined expansion map E(p), a corrected expansion exponent map $E_{bright}(p)$ is computed according to the equation (2), $E_{bright}(P) = E(p) - p_{bright} \cdot M_{bright}(p)$, in a $E_{bright}(p)$ calculating sub step E23.

Using the high frequencies extraction module 40, in a third step S3 of the present embodiment, high spatial frequencies of luminance values in the original image I are extracted to obtain a pixel luminance-enhancement value $Y_{enhance}(p)$ for each pixel p of the image I having its luminance value Y(p). This step is for instance performed as described in WO 2015/096955.

Using the inverse tone mapping module 50, in a fourth step S4 of the present embodiment, the luminance Y(p) of each pixel p of the image I is inverse tone mapped, or converted, into an expanded luminance $Y_{exp}(p)$ obtained through the product of the luminance of this pixel p at the power of the corrected expansion exponent value $E_{bright}(p)$ obtained for this pixel p from the second step S2 and of the pixel luminance-enhancement value $Y_{enhance}(p)$ obtained for this pixel p from the third step S3 at the power of an exponent parameter c, where c is superior or equal to 1. It means that the expanded luminance $Y_{exp}(p)$ for the pixel p of the original image I is computed according to the equation:

$$Y_{exp}(p) = Y(p)^{E_{bright}(p) * [Y_{enhance}(p)]c} \quad (9)$$

The exponent parameter c controls the amount of detail enhancement brought by pixel luminance-enhancement value. Therefore, larger values of c gradually increase the contrast of image edges. A value of c=1.5 is preferably used.

The expanded luminance values $Y_{exp}(p)$ for all the pixels p of the original image I are thus computed using a attenuated expansion map $E_{bright}(p)$. The latter map is based on a predetermined expansion map, specifically adapted to the image I, that is further corrected so as to avoid a bad grading in the bright areas of the image I. Thus a HDR image I' is generated and can be displayed on the HDR display device.

Advantages

Figure 3A:
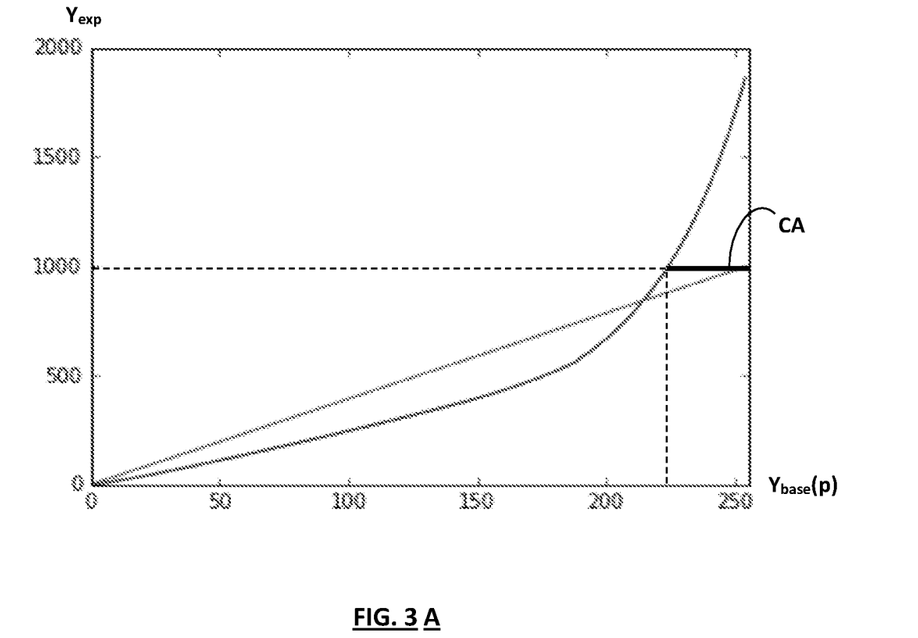
FIG. 3A is a graph representing the relation between the input luminance of image pixels and the corresponding output luminance after application of a predetermined expansion map.
Figure 3B:
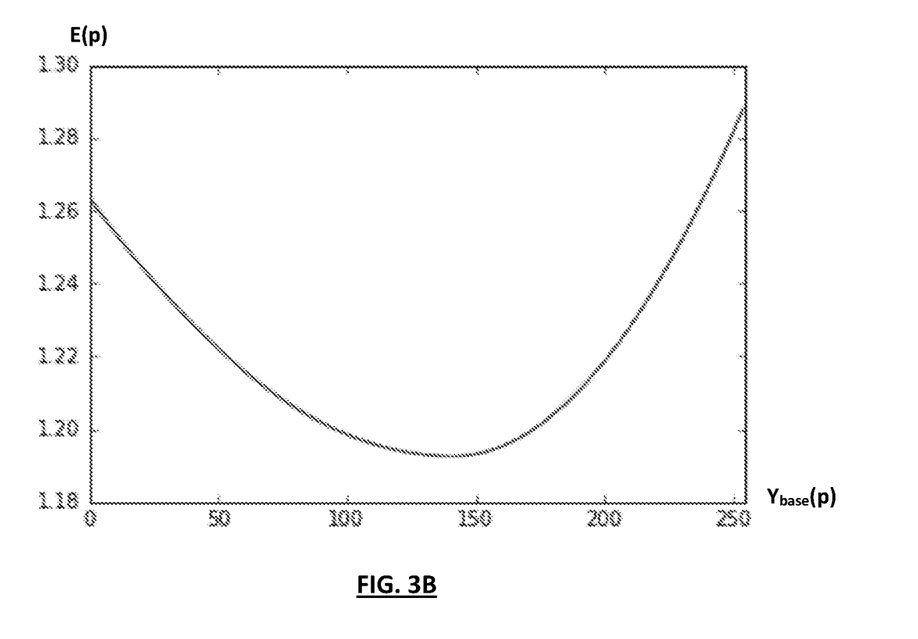
FIG. 3B represents said predetermined expansion map.

On one hand, FIG. 3B represents the predetermined expansion map E(p) obtained in the first step S1. More precisely, the input luminance values of the image pixels p (i.e. the low-pass filtered luminance $Y_{base}(p)$) are represented on the abscissa and the predetermined expansion exponent values E(p) of the images pixels p are represented on the ordinates. FIG. 3A represents the expanded luminance values of the image pixels p on the ordinates and the input luminance values of the image pixels (i.e. the low-pass filtered luminance $Y_{base}(p)$ of the pixels p) on the abscissa, in the case wherein the predetermined expansion map E(p) is used to achieve the luminance expansion (without any correction or attenuation of this expansion).

Figure 4A:
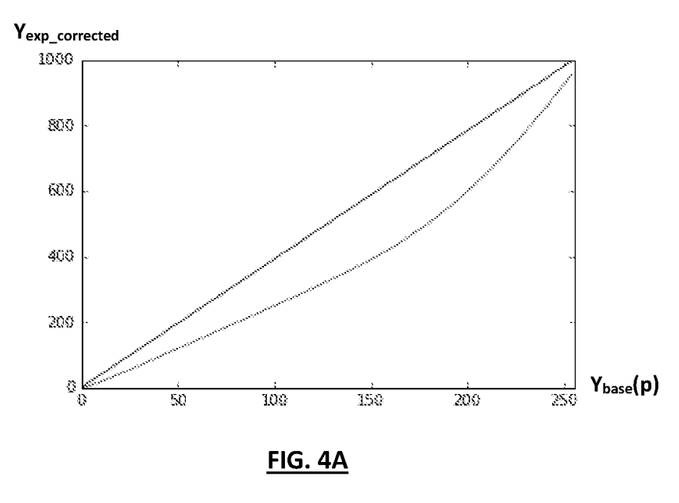
FIG. 4A is a graph representing the relation between the input luminance of image pixels and the corresponding output luminance after application of an expansion map based on the predetermined expansion map and corrected according to an embodiment of the invention.
Figure 4B:
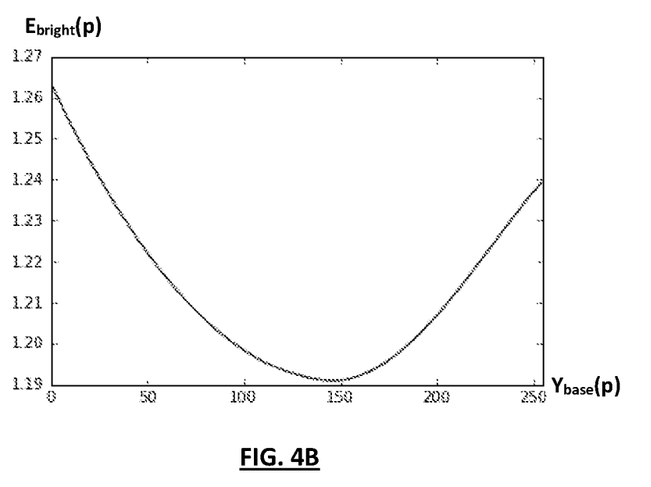
FIG. 4B represents the expansion map used in FIG. 4A.

On the other hand, FIG. 4B represents the corrected expansion map $E_{bright}(p)$ obtained in the third step S3. More precisely, the input luminance values of the image pixels p (i.e. the low-pass filtered luminance $Y_{base}(p)$) are represented on the abscissa and the corrected expansion exponent values $E_{bright}(p)$ of the image pixels p are represented on the ordinates. FIG. 4A represents the expanded luminance values of the image pixels p on the ordinates and the input luminance values of the image pixels (i.e. the low-pass filtered luminance $Y_{base}(p)$ of the pixels p) on the abscissa, in the case wherein the corrected expansion map $E_{bright}(p)$ is used to achieve the luminance expansion.

Since the maximal luminance value of the HDR display is here equal to 1000, FIG. 3A shows a clipped area CA corresponding to the pixels p which expanded luminance value is reduced to a fixed value equal to the maximal luminance 1000 of the display device since the expansion operation generates, for these pixels, expanded luminance values higher than the maximal capacity of the display device.

On the contrary, FIG. 4A shows a corrected expansion map that avoid the generation of expanded luminance values higher than the maximal luminance capacity of the display device.

The method of the invention allows to execute on an image I, automatically and possibly on the fly, an inverse tone mapping that is fully adapted to the image I, without need for increasing the storage capacity of the processing device. The highly bright areas of the image I are not clipped. They are well graded (not too much bright) and a smooth transition with the surroundings is maintained through the inverse tone mapping.

The invention claimed is:

1. A method for inverse tone mapping of at least a part of an image, the method comprising:
   obtaining a first expansion exponent map for said image;
   determining, for at least a pixel of the image, an expanded luminance value by performing an exponentiation with an expansion exponent value determined from said first expansion exponent map on a luminance value of said pixel;
   obtaining, for said pixel of the image, an expansion correcting value by using a modulating function that takes as input a value representative of the luminance of said pixel and is an increasing function whose increase is higher for higher input values;
   obtaining a corrected expansion exponent value for said pixel by subtracting said expansion correcting value from the expansion exponent value of the first expansion exponent map; and
   determining, for said pixel of the image, an expanded luminance value by performing an exponentiation with said corrected expansion exponent value on the luminance value of said pixel.

2. The method according to claim 1, wherein said modulating function achieves an exponentiation with a fixed exponent parameter on the input value.

3. The method according to claim 1, wherein said input value is a normalized value of the low-pass filtered luminance value of said image pixel.

4. The method according to claim 2, wherein the fixed exponent parameter is equal or higher than 3.

5. The method according to claim 2, wherein the expansion correcting value is determined by applying a weighting factor to a reference expansion correcting value resulting from the exponentiation with the fixed exponent parameter, and the weighting factor depends on the image and on the first expansion exponent map.

6. The method according to claim 5, wherein said weighting factor is calculated from:
   a first luminance value that is a luminance value ensuring that a first percentage of the pixels of the image have luminance values higher than said first luminance value; and
   a second luminance value corresponding to a luminance value of a pixel of the image that is tone mapped into a target maximal value of expanded luminance using the first expansion map.

7. The method according to claim 6, wherein said weighting factor is calculated using:
   a first expansion exponent value assigned to said first luminance value of said image through said first expansion exponent map;
   a second expansion exponent value assigned to said second luminance value through said first expansion exponent map; and
   a reference correcting value resulting from the exponentiation with said fixed exponent parameter on a normalized value of said first luminance value.

8. The method according to claim 7, wherein the weighting factor n bright is calculated using the expression:

$$p_{brigth} = \frac{E(p_1) - E(p_2)}{M_{brigth(p_1)}}$$

where:

E($p_1$) represents the first expansion exponent value;

E($p_2$) represents the second expansion exponent value;

$M_{brigth}(p_1)$ represents the reference attenuating value resulting from the exponentiation with said fixed exponent parameter on a normalized value of the first luminance value.

9. The method according to claim 2, wherein the modulating function assigns to an image pixel p having a low-pass filtered luminance value $Y_{base}$ (p) a reference attenuating value $M_{bright}(p)$ by calculating the expression $$M_{bright}(p) = \left(\frac{Y_{base}(p)}{255}\right)^{\gamma}$$

where $\gamma$ is said fixed exponent parameter.

10. The method according to claim 7, wherein said second expansion exponent value is calculated by dividing the logarithm of said target maximal value of expanded luminance by the logarithm of said second luminance value.

11. The method according to claim 6, further comprising comparing said first luminance value and said second luminance value, and, if said first luminance value is superior to said second luminance value, correcting the expansion exponent value for said pixel.

12. The method according to claim 1, wherein the first expansion exponent map E(p) is generated from low-pass filtered luminance values $Y_{base}(p)$ of the image pixels p using a quadratic function defined by the relation:

$$E(p) = a[Y_{base}(p)]^2 + b[Y_{base}(p)] + c.$$

where a, b, and c are parameters of the quadratic function.

13. The method according to claim 1, wherein obtaining an expansion exponent map for said image comprises:

obtaining a visual feature for said image representative of luminance of said image, comparing the visual feature of said image with visual features of at least two clusters of reference images according to a distance criterion, wherein the visual feature of a cluster is representative of the luminance of reference images of this cluster, selecting for said image the expansion exponent map related to the visual feature of a cluster which is the closest to the visual feature of said image.

14. The method according to claim 13, wherein the visual feature of said image comprises a histogram on luminance of the pixels of said image.

15. An image processing device to inverse tone map an image, the device comprising:

a processor configured to:

obtain a first expansion exponent map for an image;

determine, for at least a pixel of the image, an expanded luminance value by performing an exponentiation with an expansion exponent value determined from said first expansion exponent map on a luminance value of said pixel;

obtain, for said pixel of the image, an expansion correcting value by using a modulating function that takes as input a value representative of the luminance of said pixel and is an increasing function whose increase is higher for higher input values;

obtain a corrected expansion exponent value for said pixel by subtracting said expansion correcting value from the expansion exponent value of the first expansion exponent map; and determine, for said pixel of the image, an expanded luminance value by performing an exponentiation with said corrected expansion exponent value on the luminance value of said pixel.

16. A non-transitory computer readable storage medium having stored thereon instructions executable by a computer to perform the method according to claim 1 in order to inverse tone map an image.

17. The device according to claim 15, wherein said modulating function achieves an exponentiation with a fixed exponent parameter on the input value.

18. The device according to claim 17, wherein the fixed exponent parameter is equal to, or higher than, 3.

19. The device according to claim 17, wherein the expansion correcting value is determined by applying a weighting factor to a reference expansion correcting value resulting from the exponentiation with the fixed exponent parameter, and the weighting factor depends on the image and on the first expansion exponent map.

20. The device according to claim 17, wherein the modulating function assigns to an image pixel p having a low-pass filtered luminance value $Y_{base}(p)$ a reference attenuating value $M_{bright}(p)$ by calculating the expression $$M_{bright}(p) = \left(\frac{Y_{base}(p)}{255}\right)^{\gamma}$$

where $\gamma$ is said fixed exponent parameter.

* * * * *